US008668212B2

(12) United States Patent
Renner et al.

(10) Patent No.: US 8,668,212 B2
(45) Date of Patent: Mar. 11, 2014

(54) STABILIZER BAR OF FIBER REINFORCED PLASTIC COMPOSITE AND METHOD FOR ITS MANUFACTURE

(71) Applicant: Luhn & Pulvermacher-Dittmann & Neuhaus GmbH, Hagen (DE)

(72) Inventors: Ole Renner, Dresden (DE); Michael Krahl, Dresden (DE); Martin Lepper, Dresden (DE); Werner Hufenbach, Dresden (DE)

(73) Assignee: Luhn & Pulvermacher-Dittmann & Neuhaus GmbH, Hagen (DE)

( * ) Notice: Subject to any disclaimer, the term of this patent is extended or adjusted under 35 U.S.C. 154(b) by 0 days.

(21) Appl. No.: 13/655,650

(22) Filed: Oct. 19, 2012

(65) Prior Publication Data
US 2013/0113175 A1 May 9, 2013

(30) Foreign Application Priority Data
Oct. 21, 2011 (DE) .................. 10 2011 085 029

(51) Int. Cl.
*F16F 1/366* (2006.01)
(52) U.S. Cl.
USPC ...... 280/124.107; 280/124.169; 280/124.166; 267/279; 267/273; 156/245; 264/496
(58) Field of Classification Search
USPC ............ 280/124.107, 124.166; 267/273, 279; 296/146.6, 187.02; 156/245; 264/496
See application file for complete search history.

(56) References Cited

U.S. PATENT DOCUMENTS

| 4,138,141 | A | * | 2/1979 | Andersen ................... 267/273 |
| 4,292,101 | A | | 9/1981 | Reichert |
| 4,429,899 | A | | 2/1984 | Ohno et al. |
| 4,836,516 | A | * | 6/1989 | Wycech ..................... 267/279 |
| 5,311,821 | A | | 5/1994 | Lang et al. |
| 5,507,518 | A | * | 4/1996 | Nakahara et al. ...... 280/124.166 |
| 5,603,490 | A | * | 2/1997 | Folsom ..................... 267/149 |
| 5,885,688 | A | * | 3/1999 | McLaughlin ............. 428/131 |

(Continued)

FOREIGN PATENT DOCUMENTS

| DE | 36 12 777 A1 | 10/1987 |
| DE | 39 10 641 A1 | 10/1990 |

(Continued)

OTHER PUBLICATIONS

Patent Abstract of Japan; 57022017 A; Tanabe et al.; published Feb. 4, 1982 (cited in specification, p. 2, 2nd paragraph).

*Primary Examiner* — Toan To
*Assistant Examiner* — George Spisich
(74) *Attorney, Agent, or Firm* — Gudrun E. Huckett

(57) ABSTRACT

A stabilizer bar or stabilizer link in fiber composite construction is of a monolithic construction without fiber interruption. The cross section geometry, the wall thickness, and the fiber orientation vary in axial direction and radial direction such that the requirements defined by the available construction space and the expected loads are fulfilled. The fiber orientation is adjusted axially and radially load-appropriately. The middle section of the stabilizer bar that is primarily torsion-loaded is reinforced with fibers oriented between +/−35° and +/−55° relative to the longitudinal axis and the end members that are primarily bending-loaded are reinforced with fibers oriented between +/−20° and +/−40° relative to the longitudinal axis. In the transitional areas between the middle section and the end members there are transitions between these fiber orientations relatively to the longitudinal axis.

12 Claims, 2 Drawing Sheets

(56) References Cited

U.S. PATENT DOCUMENTS

| | | | |
|---|---|---|---|
| 6,116,113 A * | 9/2000 | Pazdirek et al. | 74/579 R |
| 6,641,151 B1 * | 11/2003 | Zetterstrom | 280/124.107 |
| 6,832,772 B2 * | 12/2004 | Conover | 280/124.106 |
| 7,028,998 B2 * | 4/2006 | Daily et al. | 267/273 |
| 2004/0004336 A1 * | 1/2004 | Zandbergen et al. | 280/124.1 |
| 2011/0089658 A1 | 4/2011 | Buhl et al. | |
| 2012/0169022 A1 * | 7/2012 | Schulz et al. | 280/124.106 |
| 2012/0211959 A1 * | 8/2012 | Hammelmaier et al. | 280/124.106 |

FOREIGN PATENT DOCUMENTS

| | | |
|---|---|---|
| DE | 10 2008 015 705 A1 | 10/2010 |
| DE | 10 2010 045 301 A1 | 3/2011 |
| DE | 10 2010 049 565 A1 | 4/2012 |
| EP | 0 391 222 A1 | 10/1990 |

* cited by examiner

A-A

STABILIZER BAR OF FIBER REINFORCED PLASTIC COMPOSITE AND METHOD FOR ITS MANUFACTURE

BACKGROUND OF THE INVENTION

The invention concerns a stabilizer bar in composite construction of fiber reinforced polymer as well as a method for its manufacture.

Stabilizer bars serve in vehicle engineering for coupling the deflection movement of opposed wheels, in particular when maneuvering curves, in order to thus prevent rolling movements. They form a connection between the opposed wheel suspensions of an axle whose middle section is mounted rotatably on the car body or the underbody of the vehicle. The wheel suspensions are connected, mostly by means of elastic elements, to lever-like end members that extend angularly from this middle section.

When, for example, at the time of maneuvering a curve or due to uneven road conditions, only one of the wheels of an axle deflects, the stabilizer bar twists such that also the other wheel is lifted. When the wheel that is loaded more strongly is restored after passing the curve or unevenness, the opposite wheel is lowered also. The force transmission necessary for this occurs through torsion of the middle section of the stabilizer bar as well as through bending and twisting of the angled end members. In addition, the stabilizer bar has a damping function in order to prevent escalating rocking of the vehicle in case of one-sided deflection.

When these stabilizer bars are used, in addition, for the wheel guiding and axle guiding, they are also referred to as guiding stabilizer bars or stabilizer links.

Because extreme mechanical loads can act on a stabilizer bar, primarily pure metal constructions have been used up to now. When manufacturing these stabilizer bars that are mostly made from a single piece of spring steel, first steel rods or pipes are cold-formed or hot-formed to the desired target geometry. In additional working steps, load introducing means, for example, for attaching the stabilizer bar to the underbody, as well as the connecting means for the wheel suspension are joined to the stabilizer bar blank or formed from it. Also known is the manufacture of stabilizer bars in assembled construction wherein middle section and end members are separately produced and joined by material fusing, frictional, or positive fit connections.

Stabilizer bars of metal are very heavy, on the one hand, and, particularly when configured in tubular shape, are susceptible to breakage. Hence, stabilizer bar constructions of fiber reinforced polymer have already been suggested in the past.

DB 3 612 777 A1 describes a suspension for automobiles, comprising a stabilizer bar which is comprised at least partially of fiber composite material. The angled ends of the stabilizer bar are formed from metal and are introduced into it, like the bearing eyes for attachment of force introduction elements, already during wrapping of the form of the stabilizer bar. The stabilizer bar is produced in that additional fabric tubes are applied or fibers are wrapped onto a formed hardened fiber composite fabric tube. This manufacturing process is disadvantageously very complex because the actual fiber construction occurs after forming of the stabilizer bar and therefore the application of more complicated fiber application technologies, for example, braiding or wrapping with which more stable fiber composite structures can be produced, is not possible. Hence, the stabilizer bar disadvantageously is comprised of a plurality of joined fabric tubes or is wrapped discontinuously; this leads to disadvantageous discontinuities in the fiber orientation counteracting optimal force introduction and force distribution.

JP 57022017 describes a method for manufacturing a plurality of stabilizer bars from fiber reinforced polymer in one working step. For this purpose, a fiber material impregnated with polymer is wrapped around a base body and this base body corresponds to the shape of the target stabilizer bar. In this context, on account of the curved geometry of the base body as well as the wrapping of the fibers, thinning and unfavorable fiber orientations, in particular at bending locations, are observed. Subsequently, a mold is placed around this base body and heated. At the same time, the tube located in the mold is pressurized and pressed into the heated mold. Due to the heat, the polymer and the fibers form a firm composite and fix the stabilizer bars in the desired shape which can be separated after hardening and cooling of the matrix material. Because the resulting composite body is separated in the end into several stabilizer bars, the attachment of load introduction or connecting elements can be done disadvantageously only afterwards.

The object of the invention is to overcome the disadvantages of the prior art and to propose a stabilizer bar of fiber composite material in a monolithic construction without fiber interruption for use in land vehicles and rail vehicles. This stabilizer bar should have a stiffness and strength as high as possible with a weight as low as possible as well as load-adapted and improved damping properties. In addition, a method is to be proposed for easy and inexpensive manufacture of such a stabilizer bar.

SUMMARY OF THE INVENTION

The object is solved according to the invention by a stabilizer bar or stabilizer link in fiber composite construction, with monolithic construction without fiber interruption, wherein the cross section geometry, the wall thickness as well as the fiber orientation vary in axial and radial direction such that the requirements resulting from the available construction space and the expected loads are fulfilled and the fiber orientation is adjusted axially and radially load-appropriately, wherein the middle section that is primarily torsion-loaded is reinforced with fibers oriented between +/−35 and +/−55 relative to the longitudinal axis and the end members that are primarily bending-loaded are reinforced with fibers oriented at between +/−20° and +/40 relative to the longitudinal axis and in the transitional areas (3) transitions between these fiber orientations relatively to the longitudinal axis occur. The object is further solved by the method for its manufacture, comprising the following steps:
 a) on a straight, elastic as well as contoured core by application of fibers a preformed blank (preform) is generated,
 b) the latter is formed together with the core to a bent geometry,
 c) inserted into a closed original mold/forming tool shaped in accordance with the bent geometry,
 d) in it, the fibers are joined with a matrix material to a laminate,
 e) the latter, by filling in an expanding material into the core, is compressed to its final contour
 f) and afterwards is removed from the original mold/forming tool.

Preferable further embodiments are disclosed in the dependent claims.

The stabilizer bar according to the invention is comprised of a fiber composite material, in particular of glass fibers, aramide fibers or carbon fibers that are embedded in a thermoset or thermoplastic matrix material. For ensuring a better force distribution and for minimizing the risk of breakage, the stabilizer bar is monolithic and constructed without fiber interruption. According to its use, the stabilizer bar is divided into a predominantly straight middle section wherein the exact shape is defined by the vehicle to be equipped. At both ends of this middle section, angled end members with elements for attachment to the wheel suspension are provided. Moreover, load introduction elements are provided at the stabilizer bar according to the invention for connecting the stabilizer bar to the vehicle. In the context of this application, connecting elements refer to all elements which are provided for connecting stabilizer bar and yard suspension. Load introduction elements mean all conventional elements which serve for attaching or connecting the stabilizer bar to the vehicle or the car body.

In this context, the geometry, in particular the cross section geometry, of the stabilizer bar is adapted across the whole length to the expected loads as well as the available construction space. In addition, the wall thickness course of the composite material as well as the fiber orientation is adapted in axial and radial direction to the expected loads of the stabilizer bar. In the context of this application, the radial direction refers to the sum of the directions that are defined by surface-normal lines of the cross section.

In this context, the adaptation of the cross section geometry to the expected load comprises in particular the adaptation to the load-induced stress in the material. The cross section geometry encompasses in the context of this application the cross-sectional shape, for example, circular, oval, or rectangular, as well as the cross section size, for example, the diameter or the length in radial direction.

On account of the different load on different parts of the stabilizer bar, the cross-sectional shape differs in particular between the middle section and the angled end members thereof. The primarily torsion-loaded middle section comprises preferably a cross-sectional shape that is circular as much as possible; however, oval or other cross-sectional shapes are preferred for the end members that are primarily loaded by bending.

In connection with the approximately circular cross-sectional shape of the middle section, the adaptation of the stabilizer bar to the expected torsion load occurs primarily by means of the adaptation of the diameter, the wall thickness and the fiber orientation. In this context, the wall thickness can also vary about the circumference of the stabilizer bar. In addition, an adaptation of diameter and wall thickness of the stabilizer bar occurs preferably at sites for attachment of load introduction elements.

In connection with the angled end members, the adaptation of the cross section geometry of the stabilizer bar to the expected bending stress is realized by means of the adaptation of cross-sectional shape, wall thickness and fiber orientation. In this way, the responses of the stabilizer bar to certain expected bending loads as well as its damping properties can be adjusted in a targeted fashion. In this context, the angled end members comprise preferably cross sections that deviate from a circular shape, for example, oval or approximately rectangular cross sections, with long semi-axes that are parallel to the direction of the expected force action.

The creation of special bending areas is preferred whose plastic deformation compensates in a targeted fashion the bending loads acting on the stabilizer bar. In this context, by an adaptation of the cross section geometry, for example, by a reduction of the wall thickness, the ductility of the areas that are strongly subjected to bending loads is increased. Stabilizer bars with long term stability whose response to bending loads is adjustable in a targeted fashion can be constructed by a targeted adjustment of the course of the wall thickness course in the areas surrounding these bending areas.

The bent transitional areas between the angled end members and the middle section of the stabilizer bar are exposed to combined bending and torsion loads. The adaptation of the cross section geometry to these loads as well as to the shearing forces resulting therefrom is realized primarily by the adaptation of the cross-sectional shape and the wall thickness.

In addition to taking into consideration the available construction space as well as the expected loads, the cross-sectional shape of the stabilizer bar according to the invention is matched to other functional aspects. The elements at the ends of the angled end members provided for connecting the wheel suspension comprise preferably special cross-sectional shapes that are matched to their function. It is particularly preferred that these elements are configured in the form of a flattened section and transverse bore in case of U-shaped stabilizer bars and are pin-shaped in case of C-shaped stabilizer bars.

Furthermore, an adaptation of the cross section geometry of the stabilizer bars occurs at sites for attachment of load introduction elements or for introduction of metallic bearing elements by taking into account the expected loads at this site. Such adaptations axe carried out in particular by adaptations of the wall thickness of the stabilizer bar.

In a preferred embodiment of the stabilizer bar, narrowed sections of the cross section are provided at force introduction points, in particular at points where the connection of the stabilizer bar to the vehicle is realized by means of load introduction elements. By means of these gradations in the external diameter of the stabilizer bar, the load introduction means can be safely-secured in their position without use of adhesives.

Additionally, the adaptation of the stabilizer bar according to the invention to the expected loads occurs preferably by adjusting the fiber orientation in the fiber composite material. During application of the fibers by braiding or wrapping their specific orientation is realized axially as well as in radial direction.

Preferably, primarily torsion-loaded areas of the stabilizer bar, in particular the middle section, are reinforced with fibers which are oriented at an angle of between $+/-35°$ and $+/-55°$, preferably of between $+/-40°$ and $+/-50°$, particularly preferred of $+/-45°$ relative to the longitudinal axis of the fiber layers.

It is furthermore preferred that primarily bending-loaded areas of the stabilizer bar, in particular the angled end members, are reinforced with fibers which are oriented at an angle of between $+/-20°$ and $+/-40°$, preferably of between $+/-25°$ and $+/-35°$ particularly preferably of $+/-30°$ to the longitudinal axis of the fiber layers.

Curved areas of the stabilizer bar, in particular the transitional areas between the middle section and the end members, comprise a load-adapted fiber orientation in order to be able to dissipate also shearing forces. In this context, a transition takes place between the fiber orientation of the adjoining bending-loaded or torsion-loaded areas. In addition, the combined loaded areas comprise a multi-layer laminate construction that is load-oriented, wherein the fiber orientation of the individual layers can deviate from each other.

During application of the fibers by braiding or wrapping not only their orientation but also the thickness of the resultant, fabric is adjustable in a targeted fashion. Therefore, the wall thickness of the stabilizer bar is adapted, in particular in defined load areas, to the expected loads, wherein a greater or smaller wall thickness is adjusted in accordance with the type of loading by increased or reduced fiber application.

In addition to the adaptation of the wall thickness by a specific fiber application during the braiding or wrapping process, the introduction of textile inserts at defined load areas is preferred. A load-adapted force introduction into the stabilizer bar can additionally be realized in this way by the textile inserts as the textile inserts are independent of the fiber orientation in the fiber composite material.

In another also preferred embodiment an adaptation of the fibers or their filament number to the expected loads at the stabilizer bar is realized. Thus, fibers with different filament number, for example, 3 k, 6 k, 12 k or 24 k, can be used. The use of fibers of different strength in a single component is also conceivable.

In this context, the adaptation of the wall thickness occurs preferably in bending areas of the stabilizer bar as well as at sites where later on load introduction elements are to be connected to the stabilizer bar.

In another preferred embodiment the stabilizer bar comprises load introduction and/or connecting elements which are joined entirely or partially from fiber composite material and without fiber interruption to the stabilizer bar. These load introduction elements are already embodied during fiber application, for example, by an especially formed core, and form therefore a fast composite with the remainder of the stabilizer bar. For attachment of the stabilizer bar by means of the load introduction or connecting elements to the car body or the wheel suspension, the elements formed from fiber composite material comprise connecting means, for example, internally located threads for screw connections. As separate components, these connecting means are, for example, integrally joined or braided by material fusing and/or with positive fit into the fiber composite.

Connecting elements for the wheel suspension that are comprised of fiber composite material and joined without fiber interruption to the stabilizer bar are preferably in the form of flattened ends provided with a bolt hole in case of U-shaped stabilizer bars and are preferably pin-shaped in case of C-shaped stabilizer bars.

A stabilizer bar is preferred furthermore that has load introduction or connecting elements that are joined by material fusion and/or with form fit. For the manufacture of fixed connections of stabilizer bar and car body or wheel suspension, metallic bearing elements are integrally joined by material fusing and/or inserted by form fit into the stabilizer bar, for example, are braided or wrapped in.

When the connecting elements for the wheel suspension are embodied as separate components, these components are preferably integrally joined in the composite material of the stabilizer bar, for example, by braiding, or, at the two angled end members on either end, interfaces are provided preferably for force-locking or form-fitting attachment of these components. These interfaces, for example, metallic bearing elements, are in turn integrally joined by material fusing and/or by form-fit into the composite of the stabilizer bar, for example, braided or wrapped in.

When the load introduction elements are embodied as separate components, for example, as brackets, furthermore the form-fitting connection of these components with, the stabilizer bar, for example, by narrowed sections of the cross section, is preferred. Such narrowed sections provide in connection with the example of the load introduction elements embodied as brackets for a safe fixation in axial direction which prevents lateral sliding of the stabilizer bar.

The manufacture of a stabilizer bar according to the invention begins with the application of the fibers on a core which preferably is straight and elastic. In this context, according to the invention, preferably braiding or wrapping methods are used which are known in general. In this context, in a preferred embodiment the feed action of the core occurs by means of a device comprising a plurality of thread guiding eyes. One or several threads are placed onto the rotary core through them. The application angle of the threads is exactly defined by the feed action and the rotary speed of the core.

In a preferred embodiment of the method, a contoured core is used. The first adaptation of the cross section geometry of the stabilizer bar occurs in this way as a function of the special contour of the core. For example, narrowed sections of the cross section for the later attachment of load introduction elements are provided already in the core, or the different cross-sectional shapes of middle section and end members are already present.

The preformed blank generated by application of the threads on the core by braiding or wrapping is subsequently formed together with the core to a curved geometry. In this context, in particular both end members are bent relative to the middle section of the stabilizer bar and thus its geometry as a whole is defined.

After the initial forming step, the bent preformed blank is inserted into an original mold or forming mold corresponding to its geometry, known also as an RTM tool, in which the final contouring of the stabilizer bar occurs. Herein, wetting of the matrix material with the fibers takes place. By introducing a pressure agent, for example, air, oil, water, into the tubular core, the fiber layers wetted with the matrix material are compressed into their final contour.

In a preferred embodiment of the method, the tubular preformed blank is filled with an expanding core material, for example, a foam material, and thereby loaded with pressure. Afterwards, this core can remain as a lost core in the structure or be removed after the infiltration process.

After removal of the stabilizer bar from the forming tool, the manufacture of the stabilizer bar is completed, aside from finishing touches and the removal of burrs.

In the manufacture of the stabilizer bar the conditions of wetting of the matrix material with the fibers depends on the kind of the used matrix material. When using a thermoplastic matrix material, it is integrated in the form of threads already during the braiding and/or wrapping process into the fiber layers. To join the fibers with the matrix material to a fiber composite material, a suitable temperature is adjusted during the forming process of the stabilizer bar in the closed mold. The thermoplastic matrix material thereby becomes flowable and penetrates the fiber layers. During the subsequent cooling of the closed mold, the matrix material hardens and combines with the fibers to a fiber composite material.

When using a thermoplastic or thermosetting matrix material, it is applied to the fibers in liquid form. For this purpose, suitable supply openings are provided in the closed mold tool for the reaction resin. The supply of the matrix material occurs then at the same time as the pressure loading of the core. In addition, the original mold or forming tool must be suitably temperature-controlled so that the matrix material reduces its viscosity enough to penetrate the fiber layers. During cooling and hardening of the matrix material, the latter combines finally with the fibers to a fiber composite material.

The specifically used matrix material and the specifically used fiber application method may vary with the field of application.

In the preferred use of a contoured core an adaptation of the cross section occurs already during the fiber application process. With a core with a gradated cross section course, stabilizer bars can be produced that already comprise narrowed sections of the cross section for the later attachment of load introduction elements. The braiding or wrapping of flattened or pin-shaped end members for attachment to the wheel suspension can also be realized in case of an appropriately shaped core already during the fiber application process.

When the connecting or load introduction elements are embodied as separate components, there is the possibility of integrally joining interfaces for the attachment of these elements to the stabilizer bar by material, fusing and/or form fit already during the fiber application process. For this purpose, for example, bushings or metallic bearing shells can be braided during the fiber application process into the stabilizer bar in order to attach later on the load introduction or connecting elements thereto.

Possibilities for forming load introduction elements, connecting elements for the wheel suspension, or interfaces for attachment of separate components exist also during the forming process between the fiber application process of the preformed blank and the final contouring in the closed original mold/forming tool. When forming the core, forming of the preformed blank provided thereon takes place also. As long as forming of the core takes place without compression or displacement of the core material, the position of the fibers can be preserved. Forming of flattened end members from a core with formerly circular cross section by means of suitable tools is therefore particularly preferred.

With the final contouring in the closed original mold/forming tool, the final forming of the cross-sectional shape of the stabilizer bar occurs. In addition, separate components that are inserted into the original mold/forming tool are also integrated by material fusing and/or with form fit into the fiber composite material during the original molding/forming process, in particular upon hardening of the matrix material. Hence, particularly preferred is the integration of separate load introduction or connecting elements into the fiber composite material by material fusing and/or form fit during the final contouring of the stabilizer bar.

For example, a material fusing and/or form-fitting connection of stabilizer bar and load introduction elements which surround the stabilizer bar, in particular at narrowed sections of the cross section, can be realized during the final contouring in the closed original mold/forming tool. For this purpose, the load introduction elements are also inserted into the original mold/forming tool, namely such that the preformed blank that is expanding under the pressure of the expanding core material is contacting them at the inside and is joined with them by material fusing by addition of the matrix material.

In the forming process as well as in the final contouring of the preformed blank or stabilizer bar, a reorientation of the fibers results in comparison to the fiber layers as originally applied around the core. Hence, an embodiment of the method according to the invention is preferred wherein the fiber layers are so applied that the desired load-adapted fiber orientation results only after the whole of the forming process.

This applies in particular for such areas which undergo bending during the first forming step of the preformed blank. The compression of one side of the stabilizer bar that occurs upon bending with concurrent stretching of the other side can be counteracted therefore, for example, by a suitable fiber application during the fiber application process in such a way that both sides exhibit a nearly identical fiber orientation at the end of all forming processes.

A further object of the invention is the use of a stabilizer bar according to the invention in fiber composite construction as a stabilizer link.

Stabilizer links are components which serve as an axle guide as well as rolling stabilization of the vehicle. Therefore, the stabilizer links combine the functions of the longitudinal control arm and of the stabilizer bar with each other. When using stabilizer links, furthermore the use of attachment parts such as support blocks, hanging supports, and bearings is not required. Advantageously, with a stabilizer link according to the invention it is therefore possible to save considerable weight and the fuel consumption can thus be reduced.

Also an object of the invention is the use of a stabilizer bar according to the invention in a suspension stage downstream of the chassis. Particularly preferred is the use in the driver's cab suspension for reducing the occurring rolling angles, in this context, the cross section of these so-called cabin or driver's cab stabilizer bars is adapted to the expected loads.

Furthermore, the use of a stabilizer bar according to the invention in fiber composite construction in chassis of rail vehicles is preferred. In this context, the stabilizer bar also fulfills the reduction of the rolling angle which increases in particular when maneuvering curves, in case of cross wind, or track level differences.

BRIEF DESCRIPTION OF THE DRAWINGS

In the following, possible embodiments of the stabilizer bar according to the invention will be explained in more detail with the aid of figures.

In this context, it is shown in.

DESCRIPTION OF PREFERRED EMBODIMENTS

Figure 1:
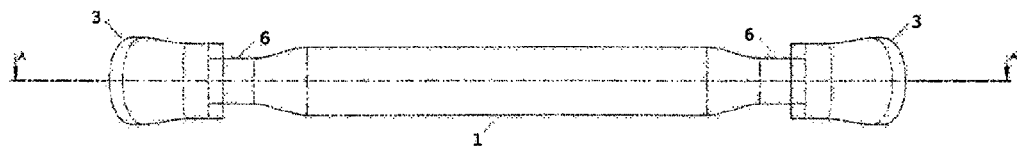
FIG. 1: side view of a C-shaped stabilizer bar of fiber reinforced polymer.

FIG. 1 shows the side view of a C-shaped stabilizer bar in composite construction of fiber reinforced polymer. The middle section 1 of the stabilizer bar comprises a cross section geometry that is load-adapted to the primarily expected torsion loads of the middle section 1. In this context, the middle section 1 comprises in particular a circular cross-sectional shape with a diameter of 90 mm and a wall thickness of 7 mm in conformity with the expected loads. The primarily torsion-loaded middle section 1 of the stabilizer bar is adjoined at both ends by bent transitional area 3. In each case before the transition of the middle section 1 into the bent transitional area 3, the middle section 1 comprises narrowed sections of the cross section 6. Between middle section 1 and narrowed sections of the cross section 6 there is a transition where the diameter of the stabilizer bar decreases uniformly. The narrowed sections of the cross section 6 serve for the later attachment of load introduction elements, for example, suspension means for connecting the stabilizer bar to the vehicle. The middle section 1 comprises at the sites of the narrowed sections of the cross section 6 a cross-sectional shape that is matched to the expected force introduction, in particular by the load introduction means. At the sites of the narrowed sections of the cross section 6 the middle section 1 comprises in particular an increased wall thickness of 12 mm. The bent transitional areas 3 of the stabilizer bar also comprise a load-adapted cross section geometry. In comparison to the middle section 1 the bent transitional areas comprise in particular no continuous rotation-symmetrical cross-sectional shape. In addition, the fiber orientation of the bent transitional areas deviates from the fiber orientation of the middle section 1, 45° relatively to the longitudinal axis of the stabilizer bar.

Figure 2:
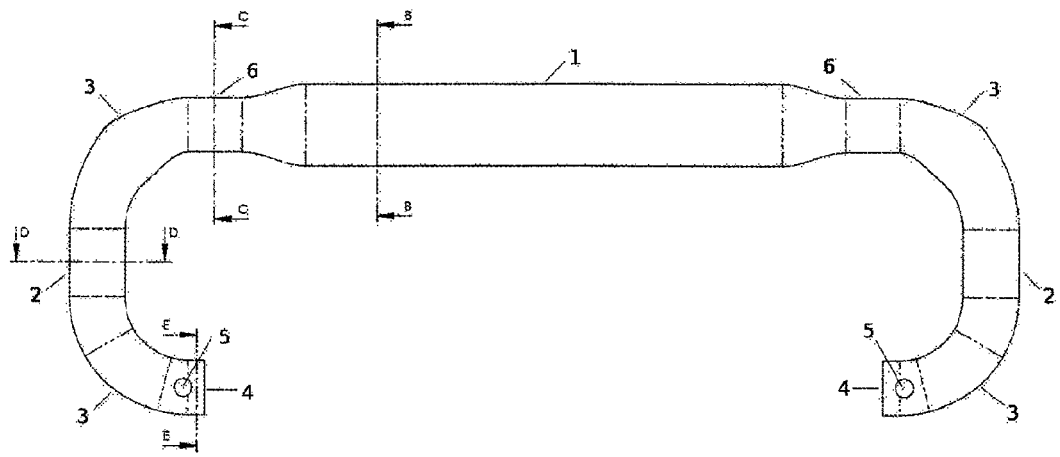
FIG. 2: plan view of a C-shaped stabilizer bar of fiber reinforced polymer.

FIG. 2 shows the plan view of the C-shaped stabilizer bar in composite construction from fiber reinforced polymer. In this view the angled end members 2 of the stabilizer bar as well as the connecting elements for the wheel suspension 4 that are provided at the ends of the stabilizer bar can be seen also. Furthermore, it can be seen that in case of a C-shaped stabilizer bar a total of four bent transitional areas 3, in particular also between the angled end members 2 and the connecting elements for the wheel suspension 4, are provided. The illustrated stabilizer bar also comprises narrowed sections of the cross section at the external ends of the middle section 1, in front of its transition into the bent transitional areas 3. In the narrowed sections of the cross section 6 the middle section 1, compared with its remaining cross section geometry (section line B-B, cf. FIG. 4), has a reduction of the diameter of the cross section surface to 60 mm as well as an increased wall thickness of 12 mm (section line C-C, cf. FIG. 4). This serves tor adapting the stabilizer bar to the increased force or load introduction by load introduction elements that are later attached at the sites of the narrowed sections of the cross section 6. At the angled end members 2 that are primarily loaded by bending the stabilizer bar comprises a cross-sectional shape that is adapted to the bending loads and is in particular not rotation-symmetrical. The oval cross-sectional shape of the angled end members 2 with a wall thickness of 7 mm, a small semi-axis of 31 mm as well as a large semi-axis of 57.5 mm (section line D-D, cf. FIG. 4) is adapted to the expected bending load on account of the large semi-axis of the oval that forms the cross section plane which semi-axis is parallel to the direction of the expected bending load. The fiber orientation in the fiber plastic composite of the angled end members 2 amounts to 30° relatively to the longitudinal axis of the stabilizer bar. At the ends of the stabilizer bar the connecting elements for the wheel suspension 4 are provided. They are embodied in the form of a flattened section and transverse bore in connection with a bolt hole 5. The cross-sectional shape of the connection for the wheel suspension 4 (section line E-E, cf. FIG. 4) is adapted to this function, in particular the fast fixation of a bolt in the bolt hole 5 by means of screw connections. For this purpose, the cross-sectional shape comprises parallel opposite sides, respectively. The wall thickness of the stabilizer bar at the connecting elements for the wheel suspension amounts to 7 mm, the length at the narrow sides amounts to 60 mm and at the sides at right angles thereto 100 mm.

Figure 3:
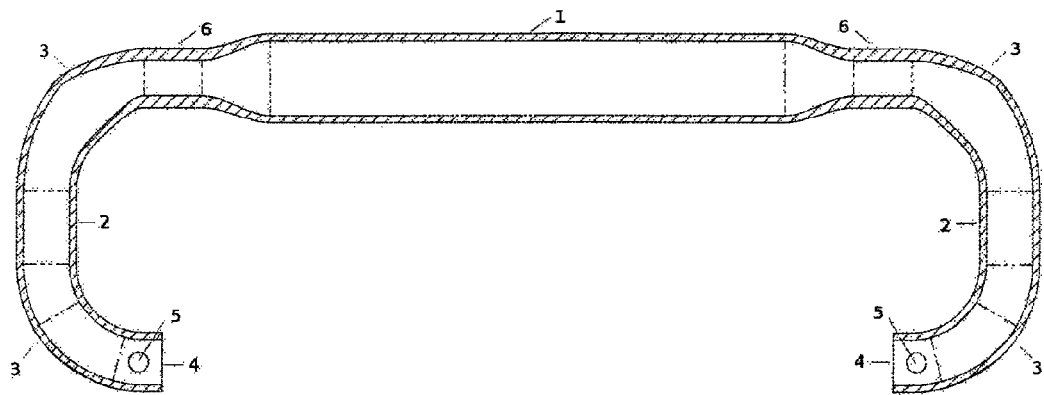
FIG. 3: section illustration of a C-shaped stabilizer bar along the section line A-A in FIG. 1, FIG. 4: cross-sectional shapes of a C-shaped stabilizer bar in the section planes of FIG. 2, and FIG. 5: side view and section illustration of a connecting element for the wheel suspension.

FIG. 3 shows the section illustration of the C-shaped stabilizer bar in composite construction from fiber plastic composite along the section line A-A (FIG. 1). The illustration shows the varying, load-adapted course of the wall thickness of the stabilizer bar according to the invention. The wall thickness in the middle section 1 of the stabilizer bar amounts to 7 mm and to 12 mm at the narrowed sections of the cross section 6. At the transition of middle section 1 to narrowed sections of the cross section 6, the diameter of the stabilizer bar uniformly decreases from 90 mm to 60 mm while the wall thickness at the same time steadily increases. In the bent transitional areas 3 between narrowed sections of the cross section 6 and angled end members 2 a decrease of the wall thickness from 12 mm to 7 mm occurs within the angled end members 2. The diameter of the stabilizer bar varies in the bent transitional areas 3 between narrowed sections of the cross section 6 and angled end members 2 on account of the transition from circular (section line C-C, cf. FIG. 4) to oval cross-sectional shape (section line D-D, cf. FIG. 4). In the bent transitional areas 3 between angled end members 2 and connecting elements for the wheel suspension 4 the wall thickness of the stabilizer bar remains constant and amounts therefore to 7 mm at the connecting elements for the wheel suspension 4. At the same time, there is a transition from oval cross-sectional shape (section line DD, cf. FIG. 4) to approximately rectangular cross-sectional shape with rounded corners (section line E-E, cf. FIG. 4).

Figure 4:
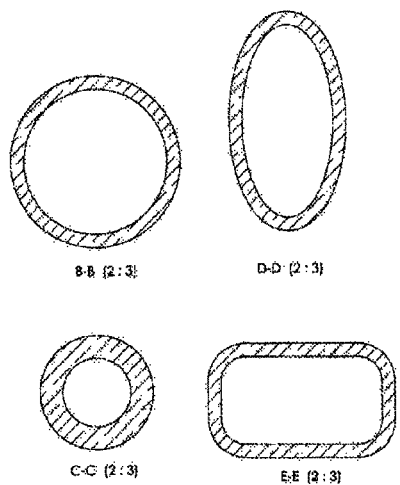

FIG. 4 shows the cross section planes of the stabilizer bar at the section lines B-B, C-C, D-D and E-E shown in FIG. 1. The section line B-B cuts the stabilizer bar in the middle section 1 which has a circular cross-sectional shape with a wall thickness of 7 mm and an external diameter of 90 mm. The section line C-C cuts the stabilizer bar at the narrowed sections of the cross section 6 which have a circular cross-sectional shape with a wall thickness of 12 mm and an external diameter of 60 mm. The section line D-D cuts the stabilizer bar at the angled end members 2 which have an oval cross-sectional shape with a wall thickness of 7 mm, a small semi-axis of 31 mm and a large semi-axis 57.5 mm. The section line E-E cuts the stabilizer bar at the connecting elements for the wheel suspension 4 which have an approximately rectangular cross-sectional shape with rounded corners and a wall thickness of 7 mm as well as paired parallel opposite sides of a length of 100 mm and 60 mm.

Figure 5:
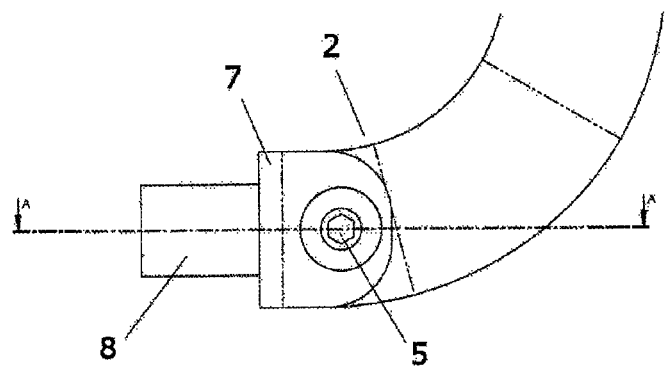
Figure 5:
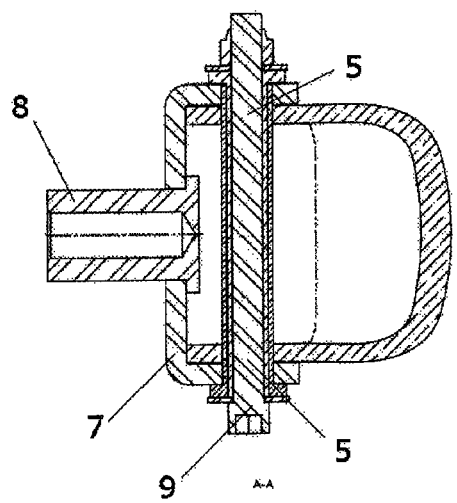

FIG. 5 show's the side view of the angled end member of a C-shaped stabilizer bar with a connecting element for the wheel suspension as well as a section illustration along the section line A-A indicated in the side view. The connection for the wheel suspension 4 is embodied preferably pin-shaped in case of the C-shaped stabilizer bars. In this context, the pins can be embodied without fiber interruption from the fiber composite material proper or as a separate component. In FIG. 5, the form-fitting connection of a separate pin-shaped connecting element for the wheel suspension 4 is illustrated in a side view and a section illustration. In this context, the angled end members 2 of a stabilizer bar according to the invention comprise a circular cross-sectional shape with an external diameter of 60 mm and a wall thickness of 7 mm. At the ends of the angled end members 2 an interface is provided for form-fitting connection of a separate connecting element for the wheel suspension 4 in the form of a bolt hole 5. Sleeves 7 are pushed onto the ends of the angled end members 2 in such a way that cutouts in the sleeves 7 are congruent with the bolt hole 5 in the angled end members 2. In this context, the sleeves 7 can cover the ends of the angled end members 2 completely, i.e., have themselves a circular cross-sectional shape with an inner diameter of 60 mm. A pin 8 is integrated in the sleeves 7 and provides the actual connection for the wheel suspension. The pin 8 is integrated into the sleeve 7 by form fit and/or by material fusing. For connecting the separate connecting element for the wheel suspension 4, consisting of sleeve 7 and pin 8, through a bolt or a screw 9 through the cutout of the sleeve 7 as well as through the bolt hole 5 is passed and fixed in order to connect form-fittingly the sleeve 7 with the angled end member 2.

LIST OF REFERENCE CHARACTERS

1—middle section
2—angled end member
3—bent transitional area
4—connection for the wheel suspension
5—bolt hole 6—narrowed section of the cross section
7—sleeve
8—pin
9—bolt

What is claimed is:

1. Stabilizer bar or stabilizer link in fiber composite construction, with monolithic construction without fiber interruption, wherein the cross section geometry, the wall thickness and the fiber orientation vary in axial direction and radial direction such that requirements defined by available construction space and expected loads acting on the stabilizer bar or stabilizer link are fulfilled and the fiber orientation is adjusted axially and radially load-appropriately, wherein the stabilizer bar or stabilizer link has a middle section that is primarily torsion-loaded and is reinforced with fibers having a first fiber orientation between +/−35° and +/−55° relative to the longitudinal axis and the stabilizer bar or stabilizer link has end members that are primarily bending-loaded and are reinforced with fibers having a second fiber orientation between +/−20° and +/40° relative to the longitudinal axis, wherein the stabilizer bar or stabilizer link has and in the transitional areas between the middle section and the end members and in the transitional areas there are transitions between the first and second fiber orientations relatively to the longitudinal axis.

2. Stabilizer bar or stabilizer link according to claim 1, wherein the middle section has a circular cross section with a diameter and a wall thickness course wherein the diameter and the wall thickness vary in axial direction of the middle section and are adapted to the load acting on the middle section as well as the position of load introduction elements provided on the middle section, wherein the end members have a cross sectional shape and a wall thickness that are adapted to the bending load as well as the connection for the wheel suspension, and the transitional areas have a cross-sectional shape and a wall thickness that are adapted to the combined torsion and bending load.

3. Stabilizer bar or stabilizer link according to claim 1, further comprising textile inserts that, for adapting the wall thickness, are introduced at defined load areas and/or at bending areas and/or at load introduction elements.

4. Stabilizer bar or stabilizer link according to claim 1, wherein load introduction and/or connecting elements for the wheel suspension are embodied from fiber composite material and are formed without fiber interruption.

5. Stabilizer bar or stabilizer link according to claim 1, wherein load introduction and/or connecting elements for the wheel suspension are introduced in the form of metallic bearing elements and/or bushings into the fiber composite material by material fusing and/or by form fit.

6. The stabilizer bar according to claim 1 in the form of driver's cab suspensions and chassis of rail vehicles.

7. The stabilizer bar or stabilizer link according to claim 1, wherein the fiber application is reinforced or decreased for adapting the wall thickness at defined load areas and/or at bending areas and/or at load introduction elements.

8. Method for manufacturing a stabilizer bar or stabilizer link according to claim 1, comprising:
   a) generating a preformed blank by applying fibers on a straight, elastic and contoured core,
   b) forming the preformed blank together with the core to a bent geometry,
   c) inserting the preformed blank with bent geometry of step b) into a closed original mold/forming tool shaped in accordance with the bent geometry,
   d) joining the fibers with a matrix material to a laminate,
   e) compressing the laminate by filling in an expanding material into the core to a final contour
   f) and afterwards removing the compressed laminate from step e) from the original mold/forming tool.

9. Method according to claim 8, further comprising the step of supplying to the fibers a thermosetting matrix material in liquid state by an infiltration process in the closed original mold/forming tool.

10. Method according to claim 8, wherein as a preformed blank in step a) or as a laminate in step e), the load introduction elements and/or the connecting elements for the wheel suspension (4) and/or the interfaces for the attachment of separate load introduction elements and/or connecting elements for the wheel suspension are formed, as well as metallic bearing elements and/or back bearings are integrated into the fiber composite material by material fusing and/or by form fit.

11. Method according to claim 8, wherein the application of the fibers on the core according to step a) in an endless process is done such that the desired fiber orientation is adjusted only at the end of the forming process.

12. The method according to claim 8, further comprising the step of integrating a solid thermoplastic matrix material in the form of threads into the fiber layers during fiber application onto the core.

* * * * *